(12) United States Patent
Kaneko

(10) Patent No.: US 11,884,848 B2
(45) Date of Patent: Jan. 30, 2024

(54) GLASSY ADHESIVE

(71) Applicant: SHIN-ETSU CHEMICAL CO., LTD., Tokyo (JP)

(72) Inventor: Tatsuro Kaneko, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/716,097

(22) Filed: Apr. 8, 2022

(65) Prior Publication Data

US 2022/0348805 A1 Nov. 3, 2022

(30) Foreign Application Priority Data

Apr. 26, 2021 (JP) ................. 2021-074397

(51) Int. Cl.
*C08G 77/62* (2006.01)
*C09J 183/16* (2006.01)
*C08L 83/16* (2006.01)

(52) U.S. Cl.
CPC ............ *C09J 183/16* (2013.01); *C08G 77/62* (2013.01); *C08L 83/16* (2013.01)

(58) Field of Classification Search
CPC ......... C09J 183/16; C08L 83/16; C08G 77/62
See application file for complete search history.

(56) References Cited

U.S. PATENT DOCUMENTS

| | | | | |
|---|---|---|---|---|
| 3,007,886 A * | 11/1961 | Parker | ................. | C01B 21/0926 556/412 |
| 3,187,030 A * | 6/1965 | Boyer | .................... | C08G 77/62 556/412 |
| 4,861,844 A * | 8/1989 | Lebrun | ................. | C04B 35/589 528/21 |
| 4,866,149 A * | 9/1989 | Lebrun | ................. | C08G 77/62 526/90 |
| 5,124,283 A * | 6/1992 | Lebrun | ................. | C04B 35/571 501/96.2 |
| 5,904,791 A | 5/1999 | Bearinger et al. | | |
| 2010/0331498 A1 * | 12/2010 | Yang | ....................... | C08L 83/16 525/474 |

FOREIGN PATENT DOCUMENTS

| | | |
|---|---|---|
| JP | S53-026834 A | 3/1978 |
| JP | H09-130065 A | 5/1997 |
| JP | 2018-065938 A | 4/2018 |
| JP | 2018-192403 A | 12/2018 |
| JP | 2019-186333 A | 10/2019 |

* cited by examiner

*Primary Examiner* — Margaret G Moore

(74) *Attorney, Agent, or Firm* — Oliff PLC

(57) ABSTRACT

A glassy adhesive including a composition containing at least: a polysilazane compound having structures represented by the following formulae (A-1) and (A-2) and not containing a hydrosilyl group; and a curing catalyst, where a mole ratio of the component (A-1) to the component (A-2), which is (A-1):(A-2), is within a range of 3:7 to 7:3, the composition has a non-volatile content of 50 mass % or more, when the composition being heated at 105° C. for 3 hours, and the curing catalyst is at least one selected from the group consisting of an organic acid, a simple substance of a d block element belonging to the fourth period of the periodic table, a platinum group element, and an amphoteric element, and a compound containing the element. This provides an adhesive that is low-cost, has high UV resistance, and in which cracks and so forth do not occur even after a reflow process.

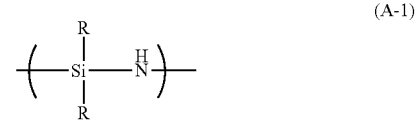

(A-1)

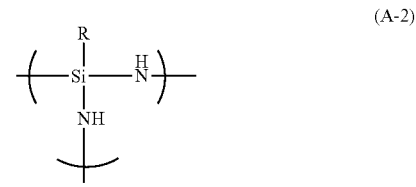

(A-2)

5 Claims, No Drawings

GLASSY ADHESIVE

TECHNICAL FIELD

The present invention relates to a glassy adhesive.

BACKGROUND ART

In recent years, technology of irradiation with ultraviolet light for the purpose of disinfection, cleaning, etc. has been developed. Specific examples include disinfection of places in medical institutions that patients touch such as doorknobs and slippers, disinfection of waste water in sewage treatment plants, cleaning of organic matter adhered to an object by decomposition, curing of UV curable resin, etc. These are achieved by an effect of a wavelength in the UV region breaking a chemical bond of organic matter or an effect of initiating a catalytic radical polymerization reaction.

Conventionally, it has been common to generate UV light from a mercury lamp, a xenon lamp, a metal halide lamp, etc. However, with the development of LED technology in recent years, UV-LEDs have also come to be given as candidates for UV irradiation sources. This is because UV-LEDs have reached a practical level owing to the improvement of output power and because UV-LEDs have a higher light conversion efficiency than conventional light sources and there is little heat output, so that energy can be saved. In addition, high output power is achieved by providing many UV-LED chips unlike lamps, which achieve high output power with a single lamp.

Therefore, UV-LEDs have an extremely high degree of freedom regarding shape, size, and so forth. From these factors, demands for UV-LEDs are rising.

LEDs have a mechanism of emitting light from a semiconductor chip. Therefore, as a matter of course, emission intensity weakens if the chip, an electric circuit connected to the chip, or the like is damaged, and in the worst case, the LED will cease to emit light. Accordingly, the chip, electric circuit, and so forth are generally protected using an encapsulant or the like in order to raise durability. Besides physical protection, this encapsulant also has a role of protecting the semiconductor chip or electric circuit from substances such as water or sulfide gas, which are harmful to the semiconductor chip and electric circuit. Inexpensive epoxy resin is often used for this encapsulant. However, due to higher output power of recent visible light LEDs, photo-degradation of epoxy resin and thermal degradation of the chip by heat generation have become notable. Therefore, silicone resin has come to be used more often.

Silicone resin has few carbon-carbon bonds, which constitute the main chain of organic resins such as epoxy resin, and mainly has siloxane bonds, Si—O—Si, which are more resistant to light and heat. Therefore, silicone resin has good light resistance and heat resistance, and is used in high-power LEDs. However, even some silicone resins cannot withstand using for UV-LEDs for UV irradiation, which use higher energy than these visible light LEDs. Thus, the few carbon-carbon bonds used during curing are broken to generate radicals. These radicals newly form crosslinking bonds, so that the silicone resin rapidly hardens. Finally, cracks occur so that the silicone resin no longer functions as an encapsulant. Accordingly, there has been suggested a system of using no encapsulant in a UV-LED, and instead, of covering, like a window, a light extraction surface of an LED with quartz glass, which does not become altered by TV and which also has high UV transmittance (e.g. Patent Document 1). However, there is a problem that the adhesive used for attaching the quartz glass window is also degraded by UV if organic resin or silicone resin is used.

To solve this problem, there has been suggested a UV-resistant silicone resin, in which a number of carbon-carbon bonds, which are particularly susceptible to UV degradation in the silicone resin, has been decreased as much as possible (e.g. Patent Document 2), etc. This UV-resistant silicone resin is mainly cured by a condensation reaction. Curing of silicone resin is usually made to proceed by making vinyl groups and hydrosilyl groups in the resin bond with each other by an addition reaction. Therefore, carbon-carbon bonds remain in the resin after the reaction, and degradation progresses by the above-described mechanism. On the other hand, the condensation reaction cures the resin by condensing hydroxy groups and alkoxy groups with each other, and therefore, has a characteristic that carbon-carbon bonds do not remain in the cured resin. For this reason, condensation-curing is generally said to have higher UV resistance than addition-curing. However, in condensation-curing, there are eliminated components such as water and alcohol during the condensation reaction. These eliminated components are liquid at normal temperature. Unless the condensation reaction progresses completely at the time of the heat treatment for curing, the condensation reaction of unreacted groups gradually progresses when using the device to generate water and alcohol. As a result, the water and alcohol not only contribute to degradation of the device, but also cause defects such as cracks and voids in the adhesive resin by evaporating and markedly increasing in volume when reheated by some factor such as a reflow process.

There is also proposed a method of using polysilazane resin instead of silicone resin (e.g. Patent Document 3). Polysilazane resin, like condensation-curable silicone resin, has no carbon-carbon bonds in the main chain, and curing is also mainly achieved through dehydrogenation condensation of hydrosilyl groups. Since the eliminated component is hydrogen gas, the eliminated component hardly remains in the cured resin compared with condensation-curable silicone resin, and defects hardly occur. However, in the dehydrogenation condensation of hydrosilyl groups in polysilazane, the difference between interatomic distances of before and after bonding is great, and great curing shrinkage stress is generated, so that cracks occur easily. In addition, dehydrogenation condensation of hydrosilyl groups requires a high temperature for curing even when a catalyst is used, and reaction is often insufficient when curing is performed at a low temperature. Accordingly, a heat-curing treatment is essential, so that there is also a restriction that dehydrogenation condensation cannot be employed for low-heat-resistance substrates of organic resin or the like. Furthermore, polysilazane that cures accompanying dehydrogenation condensation has a dense structure when cured, and therefore exhibits high gas barrier properties. Thus, when used in a structure in which a film such as an adhesive is sandwiched, the polysilazane inhibits hydrogen gas generated in the dehydrogenation condensation from escaping outside the cured film in the same manner as the condensation-curable silicone resin, and causes voids.

Meanwhile, among polysilazane resins, those having a curing mechanism that does not accompany dehydrogenation condensation are also proposed (e.g. Patent Document 4). However, in the proposed technique, a vulcanization accelerator such as a dithiocarbamate metal salt or a sulfenamide-based vulcanization accelerator is added to perform a vulcanization treatment in order to improve adhesive strength. This vulcanization treatment is effective for the adhesion of rubber or the like, but if performed in the adhesion of metal or ceramics, there is a problem that the substrate is sulfurated and cannot be used in most cases.

Accordingly, there are also proposed techniques of performing melt-adhesion with an inorganic material such as low-melting glass instead of these resins (e.g. Patent Document 5). According to this technique, degradation of LED devices due to UV can be kept to the minimum, but there is a problem that costs are extremely high.

In order to solve the above-described problems, provision of an adhesive is awaited, the adhesive having high UV resistance at low cost, allowing adhesion with sufficient strength at a low temperature, and also generating no voids, cracks, etc. even after a reflow process.

CITATION LIST

Patent Literature

Patent Document 1: JP 2019-186333 A
Patent Document 2: JP 2018-065938 A
Patent Document 3: JP H9-130065 A
Patent Document 4: JP S53-026834 A
Patent Document 5: JP 2018-192403 A

SUMMARY OF INVENTION

Technical Problem

The present invention has been made in view of the above-described circumstances, and an object thereof is to provide an adhesive that is low-cost, has high UV resistance, and in which cracks and so forth do not occur even after a reflow process.

Solution to Problem

The present invention has been made to achieve the object, and provides a coating agent having the following characteristics.

That is, the present invention provides a glassy adhesive comprising a composition containing at least:

(A) a polysilazane compound having structures represented by the following formulae (A-1) and (A-2) and not containing a hydrosilyl group,

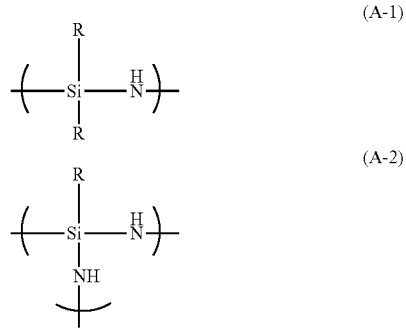

wherein R is a group selected from an aliphatic hydrocarbon group having 1 to 6 carbon atoms, an aromatic hydrocarbon group having 6 to 12 carbon atoms, and an alkoxy group having 1 to 6 carbon atoms, and Rs in the polysilazane compound are identical to or different from each other; and (B) a curing catalyst, wherein a mole ratio of the component (A-1) to the component (A-2), which is (A-1):(A-2), is within a range of 3:7 to 7:3, the composition has a non-volatile content of 50 mass % or more, when the composition being heated at 105° C. for 3 hours, and the curing catalyst is at least one selected from the group consisting of an organic acid, a simple substance of a d block element belonging to the fourth period of the periodic table, a platinum group element, and an amphoteric element, and a compound containing the element.

Such a glassy adhesive is low-cost, has high UV resistance, and cracks, etc. do not occur in the glassy adhesive even after a reflow process.

In this case, R in the formula (A-1) is preferably a methyl group.

When the polysilazane compound has a structure represented by such a formula (A-1), stability and workability of the produced polymer is improved.

Furthermore, in the present invention, R in the formula (A-2) is preferably a methyl group.

When the polysilazane compound has a structure represented by such a formula (A-2), curing rate and film property after curing become more favorable.

Furthermore, in the present invention, the curing catalyst (B) is preferably citric acid or an organic aluminum compound.

When such a curing catalyst is contained, curing reaction progresses appropriately.

Advantageous Effects of Invention

As described above, the inventive glassy adhesive includes a composition containing at least a polysilazane compound having two types of structures and a curing catalyst, and makes it possible to obtain a low-cost adhesive having high UV resistance. In addition, the inventive glassy adhesive allows adhesion at a low temperature with sufficient strength. Moreover, the inventive glassy adhesive generates no defects such as cracks even after a reflow process, and therefore, exhibits high gas barrier properties.

DESCRIPTION OF EMBODIMENTS

As described above, there has been demand for the development of an adhesive that is low-cost, has high UV resistance, allows adhesion at a low temperature with sufficient strength, and in which voids, cracks, etc. do not occur even after a reflow process.

The present inventor has earnestly studied the problem and found out that a glassy adhesive including a composition containing: a polysilazane compound that has two certain different types of structures at a certain ratio and does not contain a hydrosilyl group; and a certain curing catalyst, where a non-volatile content of the composition takes up a certain proportion or more can solve the above-described problems, and completed the present invention.

That is, the present invention is a glassy adhesive comprising a composition containing at least: (A) a polysilazane compound having structures represented by the following formulae (A-1) and (A-2) and not containing a hydrosilyl group,

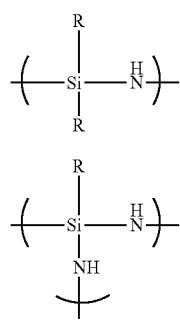

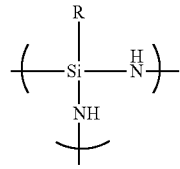

wherein R is a group selected from an aliphatic hydrocarbon group having 1 to 6 carbon atoms, an aromatic hydrocarbon group having 6 to 12 carbon atoms, and an alkoxy group having 1 to 6 carbon atoms, and Rs in the polysilazane compound are identical to or different from each other; and (B) a curing catalyst, wherein a mole ratio of the component (A-1) to the component (A-2), which is (A-1):(A-2), is within a range of 3:7 to 7:3, the composition has a non-volatile content of 50 mass % or more, when the composition being heated at 105° C. for 3 hours, and the curing catalyst is at least one selected from the group consisting of an organic acid, a simple substance of a d block element belonging to the fourth period of the periodic table, a platinum group element, and an amphoteric element, and a compound containing the element.

Hereinafter, the present invention will be described in detail, but the present invention is not limited thereto.

<Glassy Adhesive>

As described below, the inventive glassy adhesive includes a composition containing, as a component (A), a polysilazane compound having structures represented by certain formulae (A-1) and (A-2) and not containing a hydrosilyl group, and as a component (B), a curing catalyst. This composition can contain additives such as a diluent or a filler besides the components (A) and (B).

Below, these components will be described.

[(A) Polysilazane Compound]

The polysilazane compound contained in the inventive glassy adhesive has a characteristic of having two different structures and containing no hydrosilyl groups. Whether or not there are hydrosilyl groups (Si—H groups) in the polysilazane compound (polymer) can be confirmed by employing H-NMR analysis. For example, 0.02 ml of polysilazane polymer can be diluted to 3 ml with deuterated chloroform, and $^1$H-NMR measurement can be carried out using a 400-MHz NMR apparatus manufactured by Bruker Corporation. Note that when there is an Si—H bond present in the polysilazane polymer, a peak can be observed within the range of 4.0 to 5.5 ppm.

When the different structures are respectively referred to as (A-1) and (A-2), the structures are respectively represented by the following formula (A-1) and the following formula (A-2).

(A-1): The Following Formula (A-1)

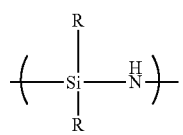

In the formula, R is a group selected from an aliphatic hydrocarbon group having 1 to 6 carbon atoms, an aromatic hydrocarbon group having 6 to 12 carbon atoms, and an alkoxy group having 1 to 6 carbon atoms, and Rs in the polysilazane compound are identical to or different from each other.

The polysilazane structure (A-1) is a structure shown by the formula (A-1) (hereinafter, also referred to as "component (A-1)"). Examples of the Rs in the formula include a methyl group, an ethyl group, a vinyl group, a phenyl group, a methoxy group, an ethoxy group, and the like, and the Rs may be identical to or different from each other within the molecule. In particular, in view of the stability and workability of the produced polymer, R is preferably a methyl group. Furthermore, when R includes an ethyl group, a vinyl group, a phenyl group, etc., the proportion of these groups relative to all Rs is preferably 10 mol % or less, further preferably 5 mol % or less in view of adhesiveness to the adherend and transparency owing to similar refractive indices.

(A-2): The Following Formula (A-2)

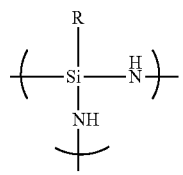

In the formula, R is a group selected from an aliphatic hydrocarbon group having 1 to 6 carbon atoms, an aromatic hydrocarbon group having 6 to 12 carbon atoms, and an alkoxy group having 1 to 6 carbon atoms, and Rs in the polysilazane compound are identical to or different from each other.

The polysilazane structure (A-2) is a structure shown by the formula (A-2) (hereinafter, also referred to as "component (A-2)"). Examples of the Rs in the formula include a methyl group, an ethyl group, a vinyl group, a phenyl group, a methoxy group, an ethoxy group, and the like, and the Rs may be identical to or different from each other within the molecule. In particular, in view of curing rate and film properties after curing, R is preferably a methyl group. Furthermore, when R includes an ethyl group, a vinyl group, a phenyl group, etc., the proportion of these groups relative to all Rs is preferably 10 mol % or less, further preferably 5 mol % or less in view of adhesiveness to the adherend and transparency owing to similar refractive indices.

In the present invention, it is important that the components (A-1) and (A-2) are blended at an appropriate ratio considering the balance among workability, curing rate, and the physical properties of the cured material. Specifically, the mole ratio of the component (A-1) to the component (A-2), which is (A-1):(A-2), needs to be within the range of 3:7 to 7:3. When the ratio is within this range, there will not arise a situation in which properties attributable to one polysilazane structure has a strong influence, so that properties attributable to the two polysilazane structures are exhibited with good balance. Therefore, this range is preferable. On the other hand, if the proportion of the component (A-1) is greater than this, the polymer has high stability and the curing rate of the coating film is slow, and this is inappropriate for use as an adhesive.

Meanwhile, if the proportion of the component (A-2) is great, curing rate is too high, so that there is not only risk of losing workability, but polymerization progresses in storage, and gelation takes place. In addition, crack resistance is degraded, so that there is also a possibility that there will not be sufficient adhesive strength when the composition is used as an adhesive.

In addition, the molecular weight of the polysilazane compound is not particularly defined, but in view of workability such as curing rate and viscosity, weight-average molecular weight is preferably within a range of 500 to 100,000. A weight-average molecular weight of 500 or more is preferable since curing progresses rapidly and an advantageous effect as an adhesive can be expected. Meanwhile, a weight-average molecular weight of 100,000 or less is preferable since viscosity is convenient for handling and there is no risk of curing during use. Note that weight-average molecular weight is measured using a GPC (gel permeation chromatography) apparatus by the method described below.

Methods for synthesizing the polysilazane compound having the polysilazane structure (A-1) and the polysilazane structure (A-2) are not particularly limited, and synthesis can be performed by a known method (e.g. methods described in Patent Documents 3 and 4). For example, a polysilazane compound can be obtained in the following manner: a halogenated silane raw material that gives the structure (A-1) (e.g. dimethyldichlorosilane) and a halogenated silane raw material that gives the structure (A-2) (e.g. methyltrichlorosilane) are added to anhydrous pyridine in such a manner that the mole ratio of the component (A-1) to the component (A-2), represented by "(A-1):(A-2)", falls within a predetermined range to give a resultant liquid; an ammonia gas is blown into the liquid to react with them; and furthermore, purification such as filtration or distillation is performed as necessary. This is a so-called pyridine complex method.

In addition, as an optional component, tetrachlorosilane may be added when synthesizing the polysilazane compound. When tetrachlorosilane is added, an effect of increasing the molecular weight of the polysilazane compound can be expected, and it is possible to improve workability, for example, shorten curing time, adjust viscosity, and so on. When tetrachlorosilane is added, the amount is preferably 0 to 5 mol % of the total amount of the components (A-1) and (A-2).

[Measurement Conditions]

Developing solvent: tetrahydrofuran (THF)
Flow rate: 0.6 mL/min
Detector: UV detector
Column: TSK Guard column Super H-L, TSK gel Super Multipore HZ-M (4.6 mm I.D.×15 cm×4) (both manufactured by Tosoh Corporation)
Column temperature: 40° C.
Sample injection volume: 20 μl (0.5 wt %-concentration THF solution)

[(B) Curing Catalyst]

A curing catalyst used in the present invention is at least one selected from the group consisting of (I) an organic acid, (II) a simple substance of a d block element belonging to the fourth period of the periodic table, a platinum group element, and an amphoteric element, and (III) a compound containing the above element. The curing catalyst is not particularly restricted as long as the polymerization of the used polysilazane compound can be made to progress.

Specific examples of the curing catalyst include (i) organic acids including carboxylic acids such as formic acid, acetic acid, propionic acid, butyric acid, linolenic acid, linoleic acid, oleic acid, and oxalic acid and hydroxy carboxylic acids such as malic acid and citric acid and (ii) a simple substance of a metal selected from the group consisting of a d block element belonging to the fourth period of the periodic table such as titanium, manganese, cobalt, nickel, and zinc, a platinum group element such as ruthenium, rhodium, palladium, osmium, iridium, and platinum, an amphoteric element such as aluminum, tin, and zinc, and a compound containing the above metal element.

The component (B) curing catalyst is preferably citric acid or an organic aluminum compound. In particular, an organic aluminum compound is particularly preferable since a small amount added makes the curing reaction progress, the organic aluminum compound is soluble in solvents, and does not become colored.

Examples of the organic aluminum compound include an aluminum salt of an organic acid such as aluminum carboxylate, aluminum alkoxide, and an acetylacetonate complex of aluminum. A compound having a different anion or ligand such as dibutoxy(2-oxo-5-oxa-3-heptene-4-yloxy) aluminum is also possible.

The mixing ratio of the curing catalyst to the polysilazane compound varies depending on the composition of the polysilazane compound and the type of the curing catalyst to be added, and is therefore not particularly limited. For example, when an organic aluminum compound is used, the added amount is preferably within the range of 0.01 to 5 parts by mass relative to 100 parts by mass of the polysilazane compound. Within this range, the composition has excellent balance between curing rate and workability when used as an adhesive.

Note that in the present invention, organic metal compounds such as organic aluminum compounds indicate organic compounds containing metal, and include not only compounds having a metal-carbon bond, but also organic compounds in which a heteroatom such as an oxygen atom bonds with metal, and compounds in which metal is bonded by an ionic bond, such as organic acid salts.

[Other Additives]

Besides the polysilazane compound and the curing catalyst, the inventive glassy adhesive may contain additives such as a diluent and a filler as necessary.

Examples of the diluent include alkane compounds such as n-hexane, n-octane, and n-nonane; alkene compounds such as 1-octene, 1-nonene, and 1-decene; cycloalkane compounds such as cyclohexane, methylcyclohexane, and dimethylcyclohexane; ester compounds such as n-propyl acetate, isopropyl acetate, n-butyl acetate, isobutyl acetate, isoamyl acetate, and ethyl caproate; and ether compounds such as diethyl ether, dibutyl ether, and ethylene glycol diethyl ether. It is possible to consider using a diluent in order to adjust the viscosity of the composition or to improve wettability to a substrate, but it is necessary to make sure the non-volatile content when the composition including the polysilazane compound is heated at 105° C. for 3 hours does not go below 50 mass %. If the non-volatile content goes below 50 mass %, diluent easily remains in the cured material.

Meanwhile, examples of the filler include homogeneous or heterogeneous metal fillers containing metal elements such as magnesium, aluminum, titanium, vanadium, chromium, manganese, iron, cobalt, zinc, gallium, zirconium, niobium, palladium, and platinum; reinforcing inorganic fillers such as fumed silica, fumed titanium dioxide, and fumed alumina; and non-reinforcing inorganic fillers such as fused silica, alumina, zirconium oxide, calcium carbonate, calcium silicate, titanium dioxide, ferric oxide, and zinc oxide.

Examples of other additives include adhesive aids such as organosiloxane oligomers containing functional groups selected from a hydrosilyl group, an alkenyl group, an alkoxysilyl group, and an epoxy group, organooxysilyl-modified isocyanurate compounds, and hydrolysis condensates thereof; silicone oils such as dimethyl silicones and phenyl silicones; and the like. These can be added at any ratio in accordance with the necessary characteristics.

Note that when the filler is a simple metal substance of a d block element belonging to the fourth period of the periodic table, a platinum group element, or an amphoteric element or a compound containing the metal element, the filler also functions as a curing catalyst. Therefore, in this case, the filler can be contained in an amount of 0.01 to 5 parts by mass relative to 100 parts by mass of the polysilazane compound.

(Non-Volatile Content)

The glassy adhesive contains volatile contents like the diluent or a low-molecular-weight substance in some cases, and the non-volatile content needs to be 50 mass % or more when the composition has been heated at 105° C. for 3 hours. If the non-volatile content is less than 50 mass %, there is risk that the volatile content remains in the cured material and adversely affects physical properties. This is because the composition is easily degraded by UV if the volatile content contains an organic compound having carbon-carbon bonds. In addition, since volatile contents are liquid at normal temperature, volatile contents evaporate when reheated in a reflow process or the like and significantly increase in volume, causing defects in the adhesive resin such as cracks and voids.

As described, it is important to reduce the volatile contents, which may contribute to the degradation of the device, as much as possible.

<Usage of Glassy Adhesive>

Examples of methods for applying the inventive glassy adhesive include a roll coating method using a chamber doctor coater, a single roll kiss coater, a reverse kiss coater, a bar coater, a reverse roll coater, a forward rotation roll coater, a blade coater, a knife coater, or the like; a spin coating method; a dispensing method; a dip method; a spray method; a transfer method; a slit coat method; and the like.

There are no particular restrictions to the substrate to be coated. Examples thereof include: organic synthetic resins such as polyethylene (PE), polyvinyl chloride (PVC), polystyrene (PS), polyvinyl acetate (PVAc), polyurethane (PUR), acrylonitrile-butadiene-styrene resin (ABS), acrylic resin (PMMA), polyamide (PA), nylon, polycarbonate (PC), polyethylene terephthalate (PET), polyimide (PI), and bis-maleimide resin (BMI); silicone resins such as methyl silicone and phenyl silicone; metals such as aluminum, silicon, iron, nickel, copper, silver, and gold; oxides such as alumina, silica, titanium oxide, and zinc oxide; nitrides such as boron nitride, aluminum nitride, silicon nitride, and gallium nitride; and the like.

The thickness of the coating film varies depending on the difference from the substrate in linear expansion coefficient and the temperature to be exposed to, but is generally 0.1 to 100 μm, preferably 0.5 to 50 μm in thickness of the cured film.

After coating one or both of the members to be adhered to form an uncured polysilazane compound coating film in this manner, the coating film is preferably heated and dried. This step has the purpose of completely removing the solvent or low-molecular-weight components contained in the coating film, and is not necessarily needed when no solvent is contained.

The heating and drying temperature is usually within the range of room temperature (25° C.) to 300° C., preferably 70° C. to 150° C. Preferable methods for performing the heating and drying step include a heat treatment, a microwave treatment, and an infrared treatment. After the heating and drying treatment, the members to be adhered are pressed together so as not to allow any bubbles to enter, and curing is performed. Curing progresses sufficiently at room temperature, but can be performed even faster when heating is performed.

EXAMPLE

Hereinafter, the present invention will be specifically described with reference to Examples and Comparative Examples. However, the present invention is not restricted by the following Examples. Note that in the following examples, "parts" indicates "parts by mass". In addition, weight-average molecular weight was measured under the above-described conditions. The non-volatile content is shown as the mass: of the non-volatile content relative to the composition before heating when each composition is heated at 105° C. for 3 hours.

Confirmation that the component (A) polysilazane compound did not contain hydrosilyl groups, that is, observation of the Si—H groups in the polysilazane polymer, was performed using $^1$H-NMR analysis. As the measurement method, 0.02 ml of the polysilazane polymer was diluted to 3 ml with deuterated chloroform, and $^1$H-NMR measurement was carried out using a 400-MHz NMR apparatus manufactured by Bruker Corporation. Note that when there is an Si—H bond present in the polysilazane polymer, a peak can be observed within the range of 4.0 to 5.5 ppm.

Examples 1-3, Comparative Examples 1-7

Using polysilazane compounds A to H prepared by the following Synthesis Examples A to H, the adhesives shown in the following Table 1 were obtained. Evaluations described below were carried out regarding the obtained adhesives. In the following, the detailed data are shown in Table 1.

Synthesis Example A

To 4,000 g of pyridine were added 227 g of methyltrichlorosilane and 456 g of dimethyldichlorosilane as halogenated silane raw materials, and ammonia gas was blown into the mixture liquid at 1.0 l/minute for 390 minutes to cause a reaction. At this time, a white ammonium chloride salt was produced, and was therefore removed by filtration. The filtrate was heated under reduced pressure of about 800 Pa at 100° C. to distil off the pyridine. Thus, a polysilazane compound A was obtained. When the weight-average molecular weight of the polysilazane in this compound was measured, it was 5,200.

Synthesis Example B

To 4,000 g of pyridine were added 378 g of methyltrichlorosilane and 326 g of dimethyldichlorosilane as halogenated silane raw materials, and ammonia gas was blown into the mixture liquid at 1.0 l/minute for 430 minutes to cause a reaction. At this time, a white ammonium chloride salt was produced, and was therefore removed by filtration. The filtrate was heated under reduced pressure of about 800 Pa at 100° C. to distil off the pyridine. Thus, a polysilazane compound B was obtained. When the weight-average molecular weight of the polysilazane in this compound was measured, it was 8,700.

Synthesis Example C

To 4,000 g of pyridine were added 529 g of methyltrichlorosilane and 196 g of dimethyldichlorosilane as halogenated silane raw materials, and ammonia gas was blown into the mixture liquid at 1.0 l/minute for 460 minutes to cause a reaction. At this time, a white ammonium chloride salt was produced, and was therefore removed by filtration. The filtrate was heated under reduced pressure of about 800 Pa at 100° C. to distil off the pyridine. Thus, a polysilazane compound C was obtained. When the weight-average molecular weight of the polysilazane in this compound was measured, it was 9,800.

Synthesis Example D

To 4,000 g of pyridine were added 378 g of methyltrichlorosilane and 291 g of monomethyldichlorosilane as halogenated silane raw materials, and ammonia gas was blown into the mixture liquid at 1.0 l/minute for 400 minutes to cause a reaction. At this time, a white ammonium chloride salt was produced, and was therefore removed by filtration. The filtrate was heated under reduced pressure of about 800 Pa at 100° C. to distil off the pyridine. Thus, a polysilazane compound D was obtained. When the weight-average molecular weight of the polysilazane in this compound was measured, it was 10,200.

Synthesis Example E

To 4,000 g of pyridine were added 291 g of monomethyldichlorosilane and 255 g of dichlorosilane as halogenated silane raw materials, and ammonia gas was blown into the mixture liquid at 1.0 l/minute for 340 minutes to cause a reaction. At this time, a white ammonium chloride salt was produced, and was therefore removed by filtration. The filtrate was heated under reduced pressure of about 800 Pa at 100° C. to distil off the pyridine. Thus, a polysilazane compound E was obtained. When the weight-average molecular weight of the polysilazane in this compound was measured, it was 1,500.

Synthesis Example F

To 4,000 g of pyridine was added 756 g of methyltrichlorosilane as a halogenated silane raw material, and ammonia gas was blown into the mixture liquid at 1.0 l/minute for 510 minutes to cause a reaction. At this time, a white ammonium chloride salt was produced, and was therefore removed by filtration. The filtrate was heated under reduced pressure of about 800 Pa at 100° C. to distil off the pyridine. Thus, a polysilazane compound F was obtained. When the weight-average molecular weight of the polysilazane in this compound was measured, it was 25,100.

Synthesis Example G

To 4,000 g of pyridine were added 151 g of methyltrichlorosilane and 522 g of dimethyldichlorosilane as halogenated silane raw materials, and ammonia gas was blown into the mixture liquid at 1.0 l/minute for 380 minutes to cause a reaction. At this time, a white ammonium chloride salt was produced, and was therefore removed by filtration. The filtrate was heated under reduced pressure of about 800 Pa at 100° C. to distil off the pyridine. Thus, a polysilazane compound G was obtained. When the weight-average molecular weight of the polysilazane in this compound was measured, it was 1,100.

Synthesis Example H

To 4,000 g of pyridine were added 605 g of methyltrichlorosilane and 131 g of dimethyldichlorosilane as halogenated silane raw materials, and ammonia gas was blown into the mixture liquid at 1.0 l/minute for 480 minutes to cause a reaction. At this time, a white ammonium chloride salt was produced, and was therefore removed by filtration. The filtrate was heated under reduced pressure of about 800 Pa at 100° C. to distil off the pyridine. Thus, a polysilazane compound H was obtained. When the weight-average molecular weight of the polysilazane in this compound was measured, it was 7,800.

Example 1

70 parts of the polysilazane compound A obtained in Synthesis Example A, 26 parts of dibutyl ether, 0.07 parts of dibutoxy(2-oxo-5-oxa-3-heptene-4-yloxy)aluminum (Chelope EB-2 manufactured by Hope Chemical Co., Ltd.), and 3.93 parts of ethanol were mixed with a vacuum defoaming mixer for 5 minutes to obtain an adhesive A. This adhesive A was applied to a 1-mm thick alumina plate and was heated at 100° C. for 10 minutes to dry. After that, a 0.5-mm thick glass plate was pressed down from above so as not to let bubbles in, and was left standing at 25° C. and a humidity of 40% for 24 hours for adhesion. The sample after being left standing had been adhered firmly, and no voids or cracks were observed. Furthermore, when a reflow test was performed, no change in appearance was observed between before and after the reflow test. In addition, when a UV irradiation test was performed on a sample obtained by making an alumina plate adhere to a quartz glass plate according to the same method, no degradation caused by UV was observed.

Example 2

70 parts of the polysilazane compound B obtained in Synthesis Example B, 26 parts of dibutyl ether, 0.07 parts of dibutoxy(2-oxo-5-oxa-3-heptene-4-yloxy)aluminum (Chelope EB-2 manufactured by Hope Chemical Co., Ltd.), and 3.93 parts of ethanol were mixed with a vacuum defoaming mixer for 5 minutes to obtain an adhesive B. This adhesive B was applied to a 1-mm thick alumina plate and was heated at 100° C. for 10 minutes to dry. After that, a 0.5-mm thick glass plate was pressed down from above so as not to let bubbles in, and was left standing at 25° C. and a humidity of 40% for 24 hours for adhesion. The sample after being left standing had been adhered firmly, and no voids or cracks were observed. Furthermore, when a reflow test was performed, no change in appearance was observed between before and after the reflow test. In addition, when a UV irradiation test was performed on a sample obtained by making an alumina plate adhere to a quartz glass plate according to the same method, no degradation caused by UV was observed.

Example 3

70 parts of the polysilazane compound C obtained in Synthesis Example C, 26 parts of dibutyl ether, 0.07 parts of dibutoxy(2-oxo-5-oxa-3-heptene-4-yloxy)aluminum (Chelope EB-2 manufactured by Hope Chemical Co., Ltd.), and 3.93 parts of ethanol were mixed with a vacuum defoaming mixer for 5 minutes to obtain an adhesive C. This adhesive C was applied to a 1-mm thick alumina plate and was heated at 100° C. for 10 minutes to dry. After that, a 0.5-mm thick glass plate was pressed down from above so as not to let bubbles in, and was left standing at 25° C. and a humidity of 40% for 24 hours for adhesion. The sample after being left standing had been adhered firmly, and no voids or cracks were observed. Furthermore, when a reflow test was performed, no change in appearance was observed between before and after the reflow test. In addition, when a UV irradiation test was performed on a sample obtained by making an alumina plate adhere to a quartz glass plate according to the same method, no degradation caused by UV was observed.

Comparative Example 1

70 parts of the polysilazane compound D obtained in Synthesis Example D, 26 parts of dibutyl ether, 0.07 parts of dibutoxy(2-oxo-5-oxa-3-heptene-4-yloxy)aluminum (Chelope EB-2 manufactured by Hope Chemical Co., Ltd.), and 3.93 parts of ethanol were mixed with a vacuum defoaming mixer for 5 minutes to obtain an adhesive D. This adhesive D was applied to a 1-mm thick alumina plate and was heated at 100° C. for 10 minutes to dry. After that, a 0.5-mm thick glass plate was pressed down from above so as not to let bubbles in, and was left standing at 25° C. and a humidity of 40% for 24 hours for adhesion. The sample after being left standing had been adhered firmly, but voids had been generated in the adhesive layer. Furthermore, when a reflow test was performed, the adhesive layer was delaminated after the reflow test. In addition, when a UV irradiation test was performed on a sample obtained by making an alumina plate adhere to a quartz glass plate according to the same method, cracks occurred in the adhesive layer.

Comparative Example 2

70 parts of the polysilazane compound E obtained in Synthesis Example E, 26 parts of dibutyl ether, 0.07 parts of dibutoxy(2-oxo-5-oxa-3-heptene-4-yloxy)aluminum (Chelope EB-2 manufactured by Hope Chemical Co., Ltd.), and 3.93 parts of ethanol were mixed with a vacuum defoaming mixer for 5 minutes to obtain an adhesive E. This adhesive E was applied to a 1-mm thick alumina plate and was heated at 100° C. for 10 minutes to dry. After that, a 0.5-mm thick glass plate was pressed down from above so as not to let bubbles in, and was left standing at 25° C. and a humidity of 40% for 24 hours. The sample after being left standing had not been adhered, and in addition, cracks had appeared in the adhesive layer. Since the sample had not been adhered, the reflow test and the UV irradiation test were not performed.

Comparative Example 3

70 parts of the polysilazane compound F obtained in Synthesis Example F, 26 parts of dibutyl ether, 0.07 parts of dibutoxy(2-oxo-5-oxa-3-heptene-4-yloxy)aluminum (Chelope EB-2 manufactured by Hope Chemical Co., Ltd.), and 3.93 parts of ethanol were mixed with a vacuum defoaming mixer for 5 minutes to obtain an adhesive F. When this adhesive F was applied to a 1-mm thick alumina plate, the solution gelatinized before the solvent was dried. Since the sample had not been adhered, the reflow test and the UV irradiation test were not performed.

Comparative Example 4

70 parts of the polysilazane compound B obtained in Synthesis Example B, 26 parts of dibutyl ether, 0.35 parts of concentrated sulfuric acid, and 3.65 parts of ethanol were mixed with a vacuum defoaming mixer for 5 minutes to obtain an adhesive B2. When this adhesive B2 was applied to a 1-mm thick alumina plate and was heated at 100° C. for 10 minutes to dry, the adhesive cured rapidly and whitened. In addition, the adhesive B2 subsequently gelatinized. Since the sample had not been adhered, the reflow test and the UV irradiation test were not performed.

Comparative Example 5

40 parts of the polysilazane compound B obtained in Synthesis Example B, 56 parts of dibutyl ether, 0.07 parts of dibutoxy(2-oxo-5-oxa-3-heptene-4-yloxy)aluminum (Chelope EB-2 manufactured by Hope Chemical Co., Ltd.), and 3.93 parts of ethanol were mixed with a vacuum defoaming mixer for 5 minutes to obtain an adhesive B3. This adhesive B3 was applied to a 1-mm thick alumina plate and was heated at 100° C. for 10 minutes to dry. After that, a 0.5-mm thick glass plate was pressed down from above so as not to let bubbles in, and was left standing at 25° C. and a humidity of 40% for 24 hours for adhesion. The sample after being left standing had been adhered, but strength was insufficient, and the sample was easily delaminated. In addition, the adhesive layer had a slight odor of solvent. Furthermore, when a reflow test was performed, voids had occurred. In addition, when a UV irradiation test was performed on a sample obtained by making an alumina plate adhere to a quartz glass plate according to the same method, discoloration was observed in the UV-irradiated part.

Comparative Example 6

70 parts of the polysilazane compound G obtained in Synthesis Example G, 26 parts of dibutyl ether, 0.07 parts of dibutoxy(2-oxo-5-oxa-3-heptene-4-yloxy)aluminum (Chelope EB-2 manufactured by Hope Chemical Co., Ltd.), and 3.93 parts of ethanol were mixed with a vacuum defoaming mixer for 5 minutes to obtain an adhesive G. This adhesive G was applied to a 1-mm thick alumina plate and was heated at 100° C. for 10 minutes to dry. After that, a 0.5-mm thick glass plate was pressed down from above so as not to let bubbles in, and was left standing at 25° C. and a humidity of 40% for 24 hours for adhesion. The sample after being left standing had hardly cured, and had not been adhered at all. Since the sample had not been adhered, the reflow test and the UV irradiation test were not performed.

Comparative Example 7

70 parts of the polysilazane compound H obtained in Synthesis Example H, 26 parts of dibutyl ether, 0.07 parts of dibutoxy(2-oxo-5-oxa-3-heptene-4-yloxy)aluminum (Chelope EB-2 manufactured by Hope Chemical Co., Ltd.), and 3.93 parts of ethanol were mixed with a vacuum defoaming mixer for 5 minutes to obtain an adhesive H. When this adhesive H was applied to a 1-mm thick alumina plate, the solution gelatinized before the solvent was dried. Since the sample had not been adhered, the reflow test and the UV irradiation test were not performed.

<Evaluation>

The Examples and the Comparative Examples have been summarized in Table 1. Note that in the item regarding the adhesion after being left standing at 25° C. and a humidity of 40% for 24 hours, "good" has been noted when the sample was not delaminated on being pulled hard by hand, "fair" has been noted when the sample was adhered but was delaminated on being pulled by hand, and "poor" has been noted when the sample was not adhered.

[Reflow Test]

The alumina-glass adhered samples fabricated in the Examples and Comparative Examples were subjected to a reflow test by using a reflow apparatus manufactured by TAMURA CORPORATION. The reflow conditions were as follows. The samples were once passed through a 2-m long furnace that was heated in stages of 150° C., 200° C., 220° C., 260° C., and 265° C. on a conveyor at a speed of 0.35 m/minute. Subsequently, the appearance was observed.

[UV Irradiation Test]

Samples obtained by making an alumina plate adhere to a quartz glass plate were fabricated by the same method as the alumina-glass adhered samples fabricated in the Examples and Comparative Examples. The samples were irradiated with UV by using a UV-B irradiation apparatus manufactured by Nikkiso Co., Ltd. at a wavelength of 285 nm and an output power of 45 mW from the quartz glass side at an irradiation distance of 3 cm for 168 hours. After that, the appearance was observed.

Note that "-" has been noted when the reflow test or the UV irradiation test was not performed.

In the table, halogenated silane raw materials (raw materials (A-1)) that give the structure (A-1) have been shown in the column for the name of the raw material (A-1) of the raw material halogenated silane, and halogenated silane raw materials (raw materials (A-2)) that give the structure (A-2) have been shown in the column for the name of the raw material (A-2), along with the mole ratio of each raw material. Since the condensation reaction proceeds quantitatively in the Synthesis Examples, the mole ratio (A-1):(A-2) of the component (A-1) to the component (A-2) in the prepared polysilazane compounds can be considered to be identical to the above-described mole ratio, that is, the charging ratio ("raw material (A-1)":"raw material (A-2)").

In Examples 1 to 3 and Comparative Example 1, the samples had been adhered with sufficient strength after leaving to stand at 25° C. and a humidity of 40% for 24 hours. Furthermore, in Examples 1 to 3, no faults in appearance after adhesion occurred. On the other hand, in Comparative Example 1, many voids had been generated in the adhesive after adhesion. This can be considered to be because hydrosilyl groups derived from the monomethyldichlorosilane underwent a dehydrogenation condensation reaction and hydrogen gas was generated.

Meanwhile, even after being left standing at 25° C. and a humidity of 40% for 24 hours, adhesive strength was insufficient in Comparative Example 5, and the samples had not been adhered in Comparative Examples 2, 3, 4, 6, and 7. Among these, in Comparative Examples 5 and 6, no faults occurred in appearance, but in Comparative Example 2, delamination and cracks occurred in the adhesive layer. This can be conjectured to be because curing shrinkage occurred in the adhesive coating film due to a dehydrogenation condensation reaction of the hydrosilyl groups derived from the monomethyldichlorosilane. In Comparative Examples 3, 4, and 7, the adhesive layer had gelatinized. This is a phenomenon that occurs when there is a large amount of the polymer structure derived from the methyltrichlorosilane or when the catalyst is too strong. This is a state in which the curing has proceeded before the solvent has volatilized, and the solvent has been taken into the polymer.

TABLE 1

| | | Raw material halogenated silane | | | | Non-volatile content (mass %) | Catalyst | Adhesion after leaving to stand for 24 hours | Faults after curing | After reflow test | After UV test |
|---|---|---|---|---|---|---|---|---|---|---|---|
| | Adhesive | Name of raw material (A-1) | Mole ratio | Name of raw material (A-2) | Mole ratio | | | | | | |
| Example 1 | A | Dimethyl-dichlorosilane | 7 | Methyl-trichlorosilane | 3 | 70 | Chelope EB-2 | Good | None | No change | No change |
| Example 2 | B | Dimethyl-dichlorosilane | 5 | Methyl-trichlorosilane | 5 | 70 | Chelope EB-2 | Good | None | No change | No change |
| Example 3 | C | Dimethyl-dichlorosilane | 3 | Methyl-trichlorosilane | 7 | 70 | Chelope EB-2 | Good | None | No change | No change |
| Comparative Example 1 | D | Monomethyl-dichlorosilane | 5 | Methyl-trichlorosilane | 5 | 70 | Chelope EB-2 | Good | Voids | Delamination | Cracks |
| Comparative Example 2 | E | Dichlorosilane | 5 | Monomethyl-dichlorosilane | 5 | 70 | Chelope EB-2 | Door | Delamination and cracks | — | — |
| Comparative Example 3 | F | — | — | Methyl-trichlorosilane | 10 | 70 | Chelope EB-2 | Poor | Gelation | — | — |
| Comparative Example 4 | B2 | Dimethyl-dichlorosilane | 5 | Methyl-trichlorosilane | 5 | 70 | Concentrated sulfuric acid | Poor | Whitening and gelation | — | — |
| Comparative Example 5 | B3 | Dimethyl-dichlorosilane | 5 | Methyl-trichlorosilane | 5 | 40 | Chelope EB-2 | Fair | None | Voids | Coloration |
| Comparative Example 6 | G | Dimethyl-dichlorosilane | 8 | Methyl-trichlorosilane | 2 | 70 | Chelope EB-2 | Poor | None | — | — |
| Comparative Example 7 | H | Dimethyl-dichlorosilane | 2 | Methyl-trichlorosilane | 8 | 70 | Chelope EB-2 | Poor | Gelation | — | — |

In the reflow test, no change was observed in the cured film before and after the test in Examples 1 to 3. On the other hand, the adhesive layer had been delaminated from the substrate after the test in Comparative Example 1. In Comparative Example 5, voids had occurred between the adhesive layer and the substrate. In the other Comparative Examples, the reflow test was not carried out since it was not possible to obtain sufficient cured film.

In the UV test in Examples 1 to 3, no change was observed in the adhesive layer even after the test, and sufficient adhesive strength and transparency were maintained. However, in Comparative Example 1, cracks had occurred in the adhesive layer, and adhesive strength had been degraded. Meanwhile, in Comparative Example 5, brown coloring had occurred in the part irradiated with UV. This can be considered to be because some solvent had remained. In the other Comparative Examples, the UV test was not carried out since it was not possible to obtain sufficient cured film.

It can be said from the above that the inventive glassy adhesive does not contain carbon-carbon bonds, which are intrinsically drastically degraded by UV, and does not contain components that remain in the system even when cured. In addition, as in the above results, the inventive glassy adhesive can be used as an adhesive more conveniently than by conventional glass bonding or the like.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A glassy adhesive comprising a composition containing at least:
(A) a polysilazane compound having, as internal units, only repeating units represented by the following formulae (A-1) and (A-2) and not containing a hydrosilyl group,

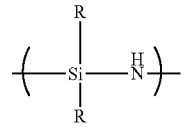

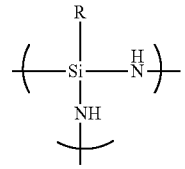

wherein R is a group selected from an aliphatic hydrocarbon group being a methyl group or an ethyl group, an aromatic hydrocarbon group having 6 to 12 carbon atoms, and an alkoxy group having 1 to 6 carbon atoms, and Rs in the polysilazane compound are identical to or different from each other; and
(B) a curing catalyst,
wherein a mole ratio of the component (A-1) to the component (A-2), which is (A-1):(A-2), is within a range of 3:7 to 7:3, the composition has a non-volatile content of 50 mass % or more, when the composition being heated at 105° C. for 3 hours, and the curing catalyst is citric acid or an organic aluminum compound.

2. The glassy adhesive according to claim 1, wherein R in the formula (A-1) is a methyl group.

3. The glassy adhesive according to claim 1, wherein R in the formula (A-2) is a methyl group.

4. The glassy adhesive according to claim 2, wherein R in the formula (A-2) is a methyl group.

5. The glassy adhesive according to claim 1, which consists essentially of the composition.

* * * * *